United States Patent [19]

Thiébaut et al.

[11] 4,199,673

[45] Apr. 22, 1980

[54] WELDING-DEVICES FOR OPERATING IN EXIGUOUS SPACES

[76] Inventors: Albert J. Thiébaut, 92, Avenue de Verdun, Romainville (Seine-Saint-Denis), France, 93230; Maurice Boell, 8, rue des Villarmains, Saint-Cloud (Hauts-de-Seine), France, 92210

[21] Appl. No.: 852,522

[22] Filed: Nov. 17, 1977

[30] Foreign Application Priority Data

Nov. 22, 1976 [FR] France ................................ 76 35051

[51] Int. Cl.² .......................................... B23K 37/04
[52] U.S. Cl. ............................... 219/60 A; 219/125.11
[58] Field of Search ............ 219/60 A, 125.1, 125.02, 219/125.12

[56] References Cited

U.S. PATENT DOCUMENTS

| 2,795,689 | 6/1957 | McNutt | 219/60 A X |
|---|---|---|---|
| 2,906,851 | 9/1959 | Kitrell | 219/60 A |
| 3,275,795 | 9/1966 | Bosna | 219/60 A X |
| 3,632,959 | 1/1972 | Nelson | 219/60 A X |
| 3,727,025 | 4/1973 | Dibenedetto | 219/60 A |
| 3,815,807 | 6/1974 | Bartley | 219/60 A X |
| 4,056,705 | 3/1976 | Linam | 219/125.1 |
| 4,068,791 | 1/1978 | Scholtus et al. | 219/60 A X |
| 4,072,828 | 2/1978 | Thome | 219/60 A X |
| 4,081,650 | 3/1978 | Barger | 219/60 A |

*Primary Examiner*—Richard R. Kucia
*Attorney, Agent, or Firm*—Wenderoth, Lind & Ponack

[57] ABSTRACT

A welding device for operating in exiguous spaces, in particular for butt-joint welding parts, e.g. tubes, includes a rotor equipped with an orbiting welding-torch and connected to a driven motor through a flexible transmission member. A control and feed device communicates with the rotor and the torch through the flexible transmission member.

9 Claims, 7 Drawing Figures

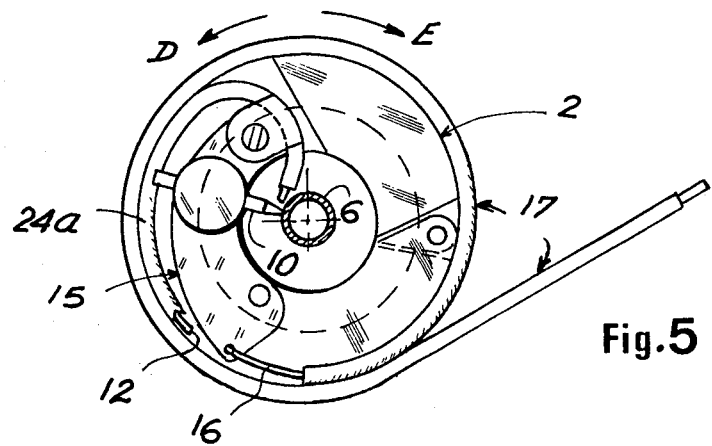
Fig.5
Fig.6
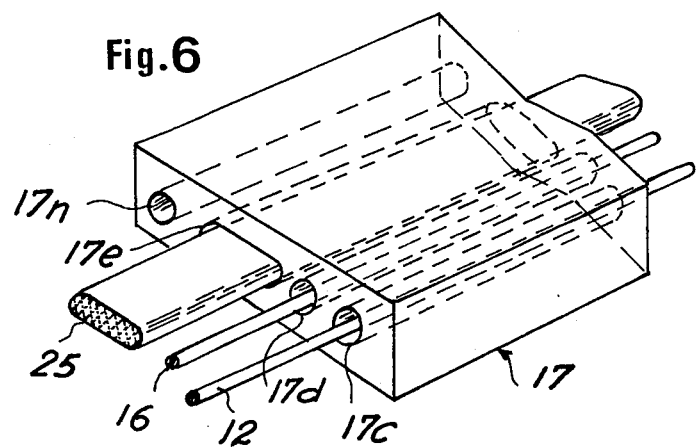
Fig.7
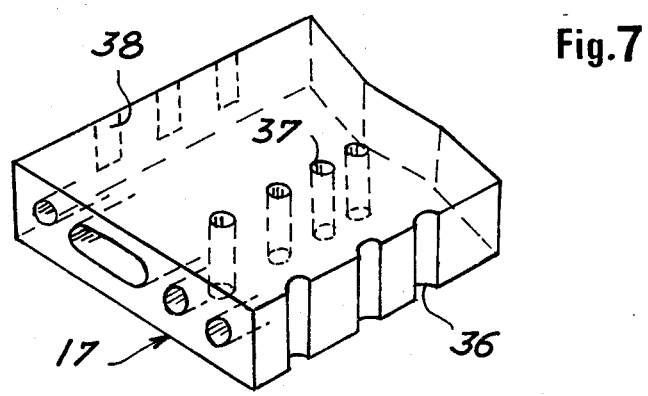

WELDING-DEVICES FOR OPERATING IN EXIGUOUS SPACES

BACKGROUND OF THE INVENTION

The present invention relates to a welding device for operating in exiguous spaces, in particular for butt-joint welding parts, e.g. tubes.

Some apparatuses are already known, of the type comprising a module equipped with all mechanical and electrical components adapted to rotate about the parts to be welded together.

Such module includes the mechanisms for moving the electric torch and those for advancing the filler-metal, are feed and control circuits as well as circuits for controlling the angular position of the torch. The welding operations can be remotely controlled by means of a programmer.

Usually, the module is divided into two parts so as to allow the mounting and withdrawal thereof with respect to the parts to be welded together.

Such apparatuses are perfectly suitable for welding great lengths of heavy tubes with diameters of at least 50 millimeters. However, they require a large free space in the immediate vicinity of the welding area.

There also exist apparatuses of smaller volumes, capable of being introduced into a limited space and permitting the butt-joint welding of parts without the use of a filler metal, in particular tubes with an outer diameter of at least about 5 millimeters.

Such apparatuses are in the form of a portable tool provided with an openable rotor capable of being mounted about the parts to be welded. The rotor is driven by a crown-gear which, in its turn, can be divided into two parts. An electric torch is placed inside one of the rotor jaws.

In view of the reduced thickness of the rotor, it is not possible to introduce a filler-metal pouring device or an auxiliary fluid, so that such apparatuses can exclusively be used for the metal-to-metal fusion welding of the parts involved.

SUMMARY OF THE INVENTION

The object of the present invention is to obviate the above drawbacks.

More specifically, the present invention relates to a welding device for operating in exiguous spaces, in particular for butt-joint welding parts, e.g. tubes, such device including a rotor equipped with an orbiting welding-torch or electrode and a mechanism for the remote control of the rotor. The device specifically includes:

a control device connected to a driven rotor equipped with an orbiting welding torch through flexible transmission member, a feed device supported by the control device and communicating with the rotor and the torch through the flexible transmission member.

This combination of features makes it possible to extend the present field of application of automatic welding by increasing the distance between the torch and the feed and control devices.

According to a preferred embodiment, the flexible transmission member comprise a connecting member, the stroke of which, in a direction parallel to the longitudinal axis thereof, is at least equal to its full wound length about the entire periphery of the rotor.

Within the ambit of the above embodiment, the means for rotating the driven rotor are connected to the inlet end of the connecting member, the parallel ducts of which are distributed between the control and feed devices.

According to a most preferred embodiment, the control device comprises a drum adapted to wind the connecting member, such drum being driven by a crown-gear in mesh with a motor provided with a speed-reducing device.

According to a variant, the control device comprises a carriage for transferring the connecting member, such carriage being movable along slide-ways via a translation motor provided with a speed reducer in mesh with a rack.

According to the invention, the feed device comprises connections necessary for operating the torch, such connections passing through parallel ducts of the connecting member and comprising at least a fluid-circuit and a filler-metal wire. In addition, such connections comprise at least an electrically-conductive cable for the torch.

In order to make it possible to adjust the electric arc during a welding operation, the control device comprises, on the one hand, connections necessary for operating the torch passing through the connecting member ducts, and, on the other hand, among such connections, at least one control cable connected to a rocking-lever articulated to the rotor, supporting the torch as well as the extremity of one of the ducts for the filler-metal.

Another object of the invention is to design the connecting member with a cross section in compliance with the conditions of of the particular device in use. To this end, the connecting member cross-section should be selected either from various quadrangular shapes, or from the group comprising circles, ellipses and related curves.

According to another preferred embodiment, it is contemplated to control the angular position of the torch by means of coding marks that, for any given advance of the connecting member, take account of the length changes due to the helical winding of the member about the rotor.

BRIEF DESCRIPTION OF THE DRAWINGS

Other features of the invention will appear from the following description given merely by way of example, with respect to the accompanying drawings, in which:

FIG. 5 is a side view of features relating to the winding of a connecting member according to the invention;

FIG. 6 is a perspective view illustrating in more detail the construction of the connecting member; and FIG. 7 is a perspective view illustrating the connecting member coding-marks.

DETAILED DESCRIPTION OF THE INVENTION

Figure 1:
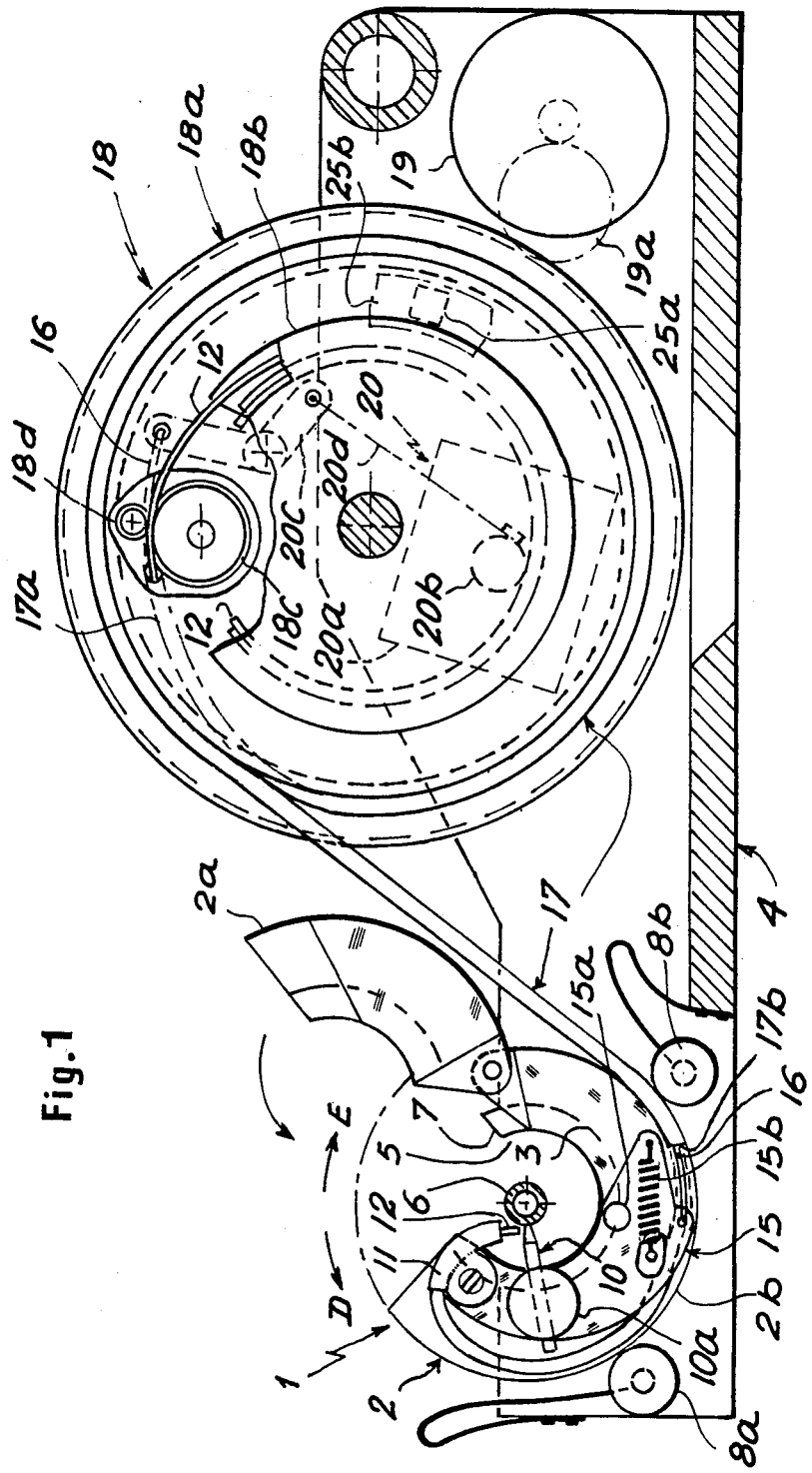
FIG. 1 is a view in elevation, partially in cross-section, of a preferred embodiment of the invention.
Figure 2:
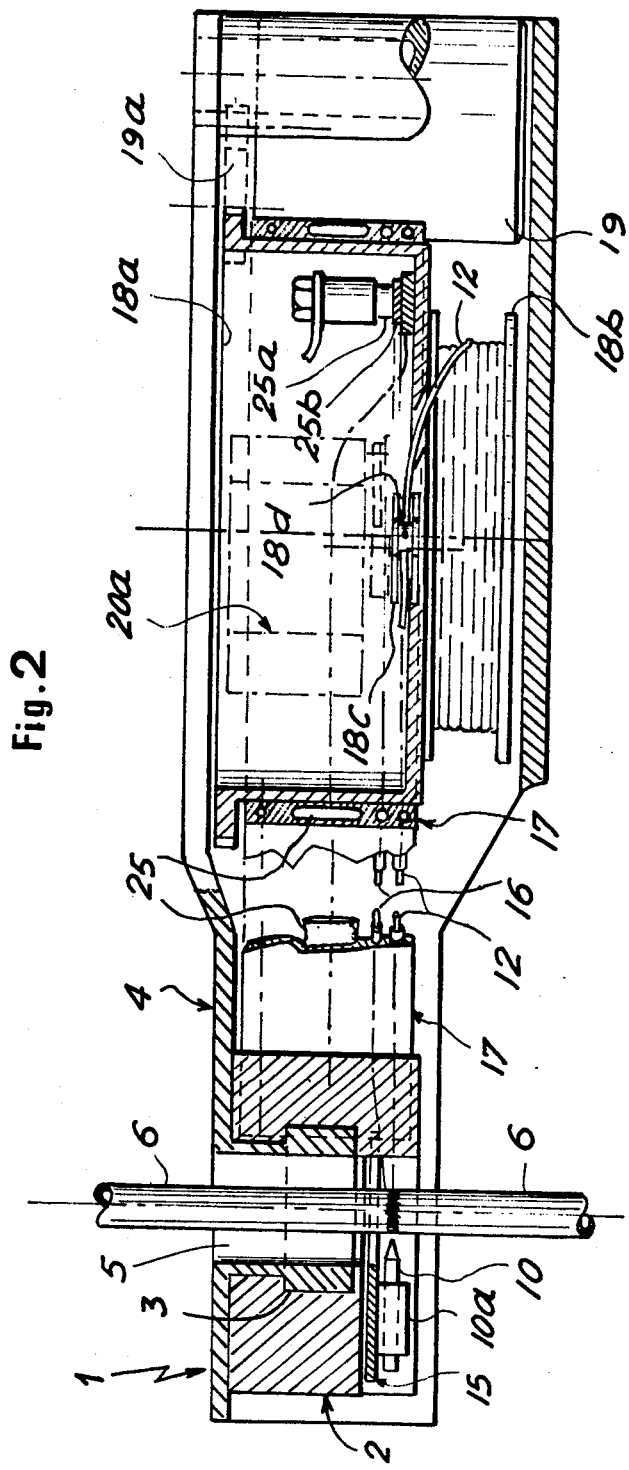
FIG. 2 is a plan view, in cross-section, of the embodiment of FIG. 1.

According to a preferred embodiment shown in FIGS. 1 and 2, the device comprises a head 1, equipped with a rotor 2, adapted to rotate about a bearing 3 fixed to a support 4.

Bearing 3, support 4 and rotor 2 have a common bore 5 in conformity with the diameters of parts 6 to be butt-welded. A radial slot 7 in bearing 3 and in support 4, together with one jaw 2a of rotor 2 make it possible to introduce head 1 about parts 6. FIG. 1 represents jaw 2a as being open, as it appears when head 1 is being introduced or withdrawn.

In the embodiment shown in the drawings, in order to provide the normal rotation of rotor 2 in spite of radial slot 7, pressure rollers 8a, 8b applied against the cylindrical periphery 2b of the rotor are provided.

Figure 3:
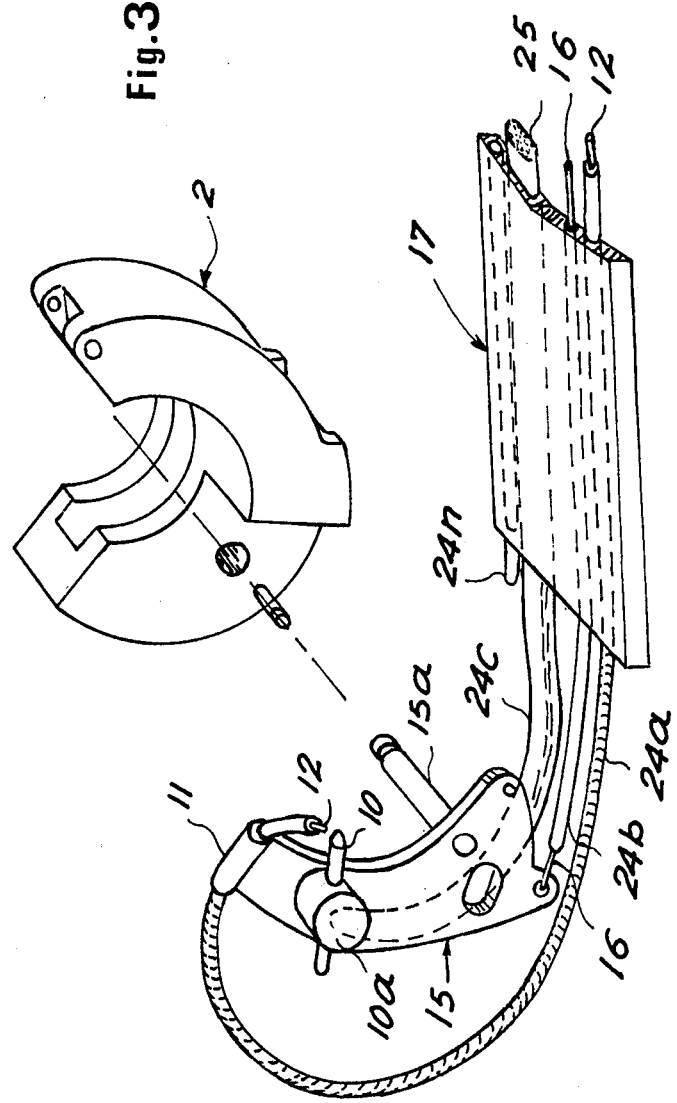
FIG. 3 is a perspective view of details of FIGS. 1 and 2.

An arc-welding torch or electrode 10 and indexable guiding member 11 for filler-metal 12 are mounted at the extremity of a rocking lever 15, articulated to a pivot 15a integral with one side of the rotor (see also FIG. 3).

Rocking lever 15 is brought into abutment by means of a spring 15b and it is driven by a control cable 16, the operation of which will be described later on.

According to the invention, a tense connecting member 17 contains the required elements for maintaining the electric arc and, if necessary, allows fluids to flow and contains control member for positioning the torch.

To this end, one inlet extremity 17a of member 17 is connected to feed and control means to be described later on, whereas one outlet extremity 17b is fixed to the periphery of rotor 2.

In a preferred embodiment, tense connecting member 17 is in the form of a strip of rectangular cross-section containing ducts such as 17c, 17d, 17e...17n (FIG. 6), parallel with the longitudinal axis of the strip.

Ducts 17c to 17n, at outlet extremity 17b, are extended by end conduits 24a, 24b, 24c...24n, (FIG. 3 and 4) respectively through which filler-metal 12, control cable 16 and electrical lead 25 reach torch 10. Such end conduits can be constituted either by members linked to the above ducts, or by extensions of sheaths mounted in the ducts.

In FIG. 6 there is shown a tense connecting member 17 of rectangular cross-section capable of allowing a satisfactory winding of the strip and an easy distribution of the ducts.

Without departing from the scope of the invention, both other quadrangular shapes and cross-sections in the form of circles, ellipses or combinations of such curves can be adopted.

Preferably, tense connecting member 17 is made from an electrically non-conductive and heat-resistant material.

Torch 10 is insulated from the bulk of the device by appropriately mounting support 10a on rocking-lever 15, e.g. by means of an electrically non-conductive ceramic member.

FIGS. 1 to 3 illustrate feed means 18 and control means 20 adapted to co-operate through the winding of tense connecting member 17.

In this instance, extremity 17a is wound about a transfer means, namely a drum 18a, the rotation of which is controlled, e.g., by means of speed reducer 19a driven by a motor 19.

One face of drum 18a is provided with driving rollers 18c, 18d, actuated by a motor (not shown) comprising a speed reducer. In the vicinity of such face is placed a filler-metal magazine constituted by a spool 18b co-axial with drum 182 and capable of rotating independently of the latter.

Whenever rollers 18c, 18d drive filler-metal 12, the latter causes the spool to rotate so as to be unwound with respect to drum 18a. Such movement causes filler-metal 12 to be pushed along its respective duct (e.g. 17), whatever the drum angular position may be.

Filler-metal 12, which can be a wire or a tape, passes through end conduit 24a (FIG. 3), and then issues from the extremity of guide-member 11, in the vicinity of torch 10.

Current is fed to torch 10 through a brush 25a adapted to rub against a conductive ring 25b (a portion of which is shown in FIGS. 1 and 2), integral with drum 18a and coaxial with the latter. Ring 25b is insulated with respect to drum 18a and connected to lead 25, the latter being adapted to feed torch 10 after having passed through duct 17e (FIG. 6).

In addition, fluids (e.g. a gas, air or coolant water) can flow through ducts such as 17n after having been injected into member 17 through extremity 17a thereof. In such case, flexible fittings and/or rotary sealing joints (not shown) provide the necessary connections with circuits outside the device as described.

The means for controlling the position of torch 10 are illustrated in FIGS. 1 to 3. In this embodiment, control cable 16 slides freely in duct 17d or in an intermediate sheath immobilized in such duct.

One end of cable 16 is connected to rocking lever 15, whereas its other end passing through extremity 17a is fixed to a swing-piece 20c, actuated by a draw rod 20d connected to rotor 20b of a swinging jack 20a, e.g. of the electrical type, All these control parts are housed in drum 18a. The movements of the rotor of jack 20a controlled by outer regulating means that do not form part of the present invention, cause cable 16 to slide in both directions with respect to the longitudinal axis of member 17.

Thus, rocking lever 15 will oscillate about its pivot 15a and bring torch 10 to its various positions dictated by the welding process (i.e. contact with the parts to be welded, initiation and maintenance of the electric arc).

Indexable guide-member 11 mounted on rocking lever 15 makes it possible to bring filler-metal 12 in close proximity to torch 10 and to orientate the same so as to achieve a very good fusion in the arc area.

Figure 4:
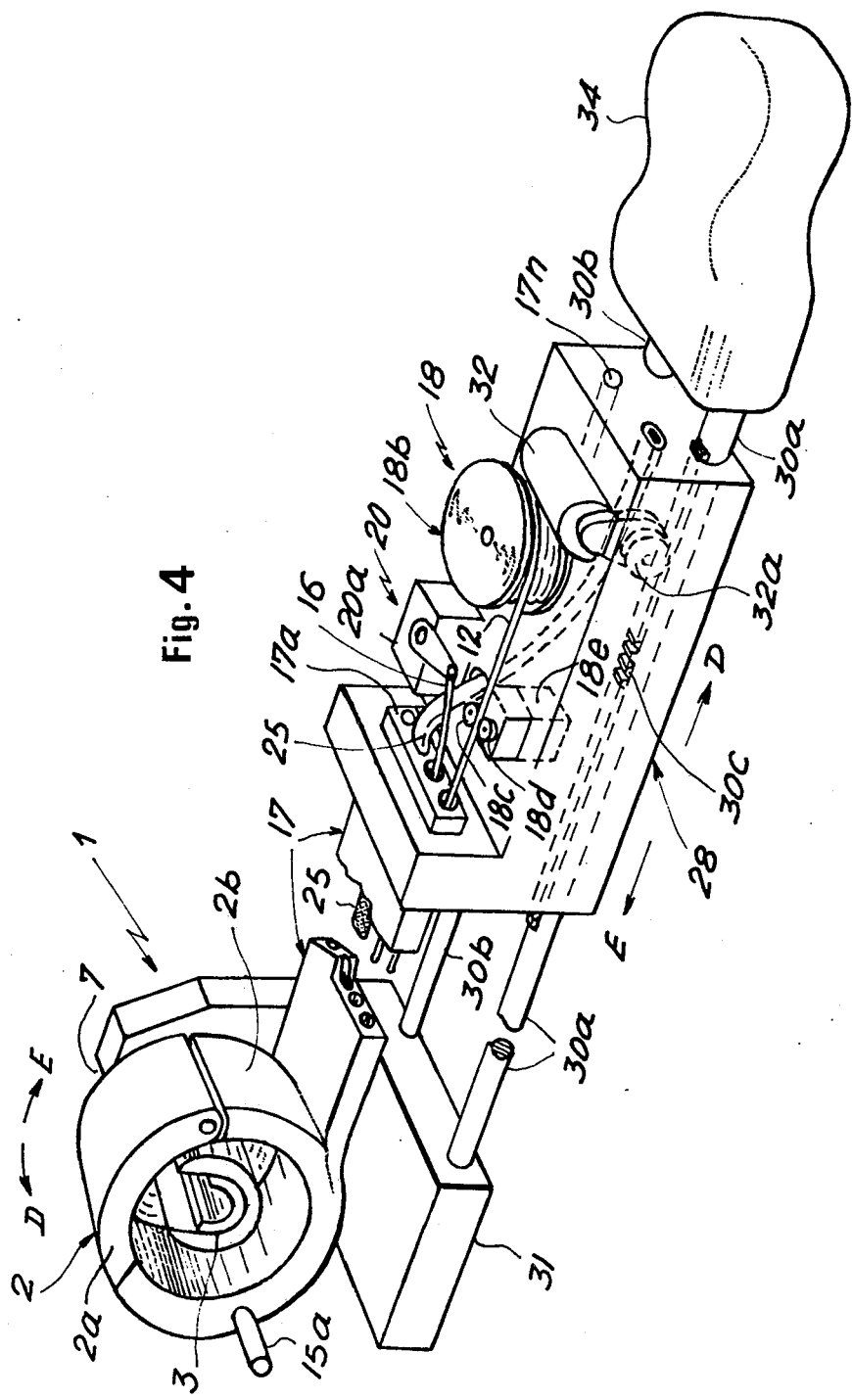
FIG. 4 is a perspective view of a modified embodiment of the invention.

In FIG. 4 are shown feed means 18 and control means 20 co-operating via rectilinear transfer means, namely a carriage 28 adapted to slide along guiding members 30a, 30b. According to this variant, inlet end 17a of member 17 is integral with carriage 28 and can thereby have imparted a rectilinear movement.

Guiding members 30a, 30b are integral with a support 31 (which is the equivalent of support 4 in FIG. 1) comprising bearing 3 of head 1, on the one hand, and with a gripping handle 34, on the other hand.

Carriage 28 supports spool 18b containing filler-metal 12, rollers 18c, 18d and their motor for causing filler-metal 12 to advance, jack 20a and also a translation motor 32. The latter actuates a speed-reducing device 32a in mesh with a rack 30c integral with guiding member 30a.

The device according to the invention operates as follows: jaw 2a is opened, so that parts 6 to be butt-welded can be introduced into common bore 5 of rotor 2, bearing 3 and support 4.

In the course of this operation, connecting member 17 is not yet wound about the periphery 2b of the rotor, and is fully located on drum 18a (as in FIGS. 1 and 2), or at a retracted position with carriage 28 pushed towards the extremities of guiding members 30a, 30b (arrow D in FIGS. 1 and 4).

Then support 4 is fixed, as in the above example, by outer means that do not form part of the invention, in order to cause the axes of parts 6 and of rotor 2 to coincide.

The operator then rotates the rotor manually so as to wind member 17 on the periphery 2b (FIGS. 1, 4 and 5, arrow E). Drum 18a of carriage 28 follow the course imparted by inlet end 17a (rotary or rectilinear translation).

When the torch has rotated by at least one turn with respect to its initial position (FIG. 5, arrow E), drum 18a, or carriage 28 is put in motion, drum 18a by motor 19 and the speed reducing device 19a thereof, and carriage 28 by motor 32, the speed reducing device 32a thereof and rack 30c. Connecting member 17 is therefore caused to unwind in the opposite direction (FIGS. 1, 4, 5, arrow D). At the same time, electric current is applied to torch 10 and filler-metal 12 is driven by rollers 18c, 18d, into its respective duct 17c. Rollers 18c, 18d are actuated by motor 18e, in the case of FIG. 4. Control cable 16 is either pulled or pushed by swinging jack 20a so as to change the position of torch 10 with respect to parts 6 and to ensure a steady operation of the electric arc.

The welding operation is finished as soon as torch 10 has reresumed its initial position (FIG. 1, arrow D), and it is then possible to open jaw 2a and to remove the device.

Without departing from the invention, tense connecting member 17 might be wound about rotor 2 in such manner that, during the unwinding thereof, the torch rotates by more than one turn about parts 6 to be welded.

In order to make it possible to control the welding steps, the invention additionally provides coding marks for member 17, making it possible to determine the angular position of torch 10, allowing for the change of length of member 17 resulting from the helical winding thereof about rotor 2.

FIG. 7 shows grouped, with a view to simplification, various coding marks consisting, e.g., of notches 36 or bores 37 or of magnetic prints 38 spaced along connecting-member 17.

Such coding marks (36,37,38) move past a fixed sensing-device that does not form part of the invention, so as to provide, as mentioned above, information related to the torch angular position and, if desired, to the speed thereof.

What is claimed is:

1. A welding device for operating in exiguous spaces, particularly for butt-joint welding parts such as tubes, said device comprising:
    a support member;
    a rotor mounted on said support member for rotation about an axis;
    a rocking lever pivotally mounted on said rotor for rotation therewith;
    a welding electrode mounted on said rocking lever for rotation therewith;
    said rocking lever being pivotable such that said electrode is moved substantially radially with respect to said rotor between a welding position and a non-welding position;
    a connecting member having a first end wound about the periphery of said rotor and a second end;
    means, supported by said support member and fixed to said second end of said connecting member, for causing said connecting member to move in a direction to be unwound from said rotor, and for thereby causing said rotor and said electrode to rotate about said axis;
    a control cable extending through said connecting member, throughout the entire length thereof, said control cable having a first end connected to said rocking lever and a second end; and
    lever control means connected to said second end of said control cable for selectively operating said cable and thereby pivoting said rocking lever and moving said electrode between said welding and non-welding positions thereof.

2. A device as claimed in claim 1, wherein said connecting member moving means comprises a rotatable drum, said second end of said connecting member being connected to said drum, such that rotation of said drum causes said connecting member to be wound on said drum and unwound from said rotor.

3. A device as claimed in claim 2, further comprising motor and gear means for driving said drum.

4. A device as claimed in claim 1, wherein said connecting member moving means comprises a carriage mounted for movement on said support member in a rectilinear direction, said second end of said connecting member being fixed to said carriage, and means for imparting movement of said carriage in said rectilinear direction and for thereby causing said connecting member to be unwound from said rotor.

5. A device as claimed in claim 4, wherein said imparting means comprises a rack fixed with respect to said support member, and motor and gear means mounted on said carriage and engaged with said rack.

6. A device as claimed in claim 1, wherein said lever control means comprises a motor operated member mounted on said connecting member moving means.

7. A device as claimed in claim 1, further comprising a supply of filler-metal wire mounted on said support member and extending freely through said connecting member, throughout the entire length thereof, said wire having a free end supported adjacent said electrode.

8. A device as claimed in claim 7, further comprising driving roller means for feeding said wire from said supply and through said connecting member, upon consumption of said wire during welding.

9. A device as claimed in claim 1, further comprising an electric power supply cable extending through said connecting member, throughout the entire length thereof, said electric power supply cable being connected to said electrode.

* * * * *